(12) United States Patent
Xu et al.

(10) Patent No.: US 11,487,950 B2
(45) Date of Patent: Nov. 1, 2022

(54) AUTONOMOUS EVOLUTION INTELLIGENT DIALOGUE METHOD, SYSTEM, AND DEVICE BASED ON A GAME WITH A PHYSICAL ENVIRONMENT

(71) Applicant: INSTITUTE OF AUTOMATION, CHINESE ACADEMY OF SCIENCES, Beijing (CN)

(72) Inventors: Jiaming Xu, Beijing (CN); Yiqun Yao, Beijing (CN); Bo Xu, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 327 days.

(21) Appl. No.: 16/641,256

(22) PCT Filed: Apr. 19, 2019

(86) PCT No.: PCT/CN2019/083354
§ 371 (c)(1),
(2) Date: Feb. 24, 2020

(87) PCT Pub. No.: WO2020/143130
PCT Pub. Date: Jul. 16, 2020

(65) Prior Publication Data
US 2021/0150151 A1 May 20, 2021

(30) Foreign Application Priority Data
Jan. 8, 2019 (CN) .......................... 201910014369.0

(51) Int. Cl.
*G06F 40/35* (2020.01)
*G06K 9/62* (2022.01)
(Continued)

(52) U.S. Cl.
CPC .......... *G06F 40/35* (2020.01); *G06K 9/6256* (2013.01); *G06K 9/6288* (2013.01);
(Continued)

(58) Field of Classification Search
CPC .......... G06F 40/35; G06F 40/44; G06F 40/56; G06F 16/332; G06F 40/216;
(Continued)

(56) References Cited

U.S. PATENT DOCUMENTS 10,776,581 B2 * 9/2020 McCann ................. G06F 40/56
10,909,329 B2 * 2/2021 Gao ..................... G06N 3/0445
(Continued)

FOREIGN PATENT DOCUMENTS

| CN | 106448670 A | 2/2017 |
| CN | 108334497 A | 7/2018 |
| CN | 108345692 A | 7/2018 |

*Primary Examiner* — Abdelali Serrou
(74) *Attorney, Agent, or Firm* — Bayramoglu Law Offices LLC (57) ABSTRACT

The method of the present disclosure includes: obtaining an image to be processed and a question text corresponding to the image; using an optimized dialogue model to encode the image into an image vector and encode the question text into a question vector; generating a state vector based on the image vector and the question vector; decoding the state vector to obtain and output an answer text. A discriminator needs to be introduced in an optimization process of the optimized dialogue model. The dialogue model and the discriminator are alternately optimized until a value of a hybrid loss function of the dialogue model and a value of a loss function of the discriminator do not decrease or fall below a preset value, thereby accomplishing the optimization process.

17 Claims, 2 Drawing Sheets

(51) Int. Cl.
*G06N 3/04* (2006.01)
*G06N 3/08* (2006.01)

(52) U.S. Cl.
CPC ......... *G06N 3/0445* (2013.01); *G06N 3/0454* (2013.01); *G06N 3/086* (2013.01)

(58) Field of Classification Search
CPC ..... G06F 40/284; G06F 40/30; G06K 9/6256; G06K 9/6288; G06K 9/6274; G06K 9/6264; G06N 3/0445; G06N 3/0454; G06N 3/086; G06N 3/0481; G06N 3/08; G06V 10/454
See application file for complete search history.

(56) References Cited

U.S. PATENT DOCUMENTS

| | | | |
|---|---|---|---|
| 11,024,424 B2* | 6/2021 | Sun | G06K 9/6218 |
| 11,126,888 B2* | 9/2021 | Xu | G06V 10/48 |
| 11,232,286 B2* | 1/2022 | Rao | G06K 9/6271 |
| 2013/0132083 A1 | 5/2013 | Yu et al. | |
| 2017/0124432 A1* | 5/2017 | Chen | G06T 1/60 |
| 2018/0121768 A1* | 5/2018 | Lin | G06K 9/6271 |
| 2018/0137941 A1* | 5/2018 | Chen | G06N 3/04 |
| 2018/0233142 A1* | 8/2018 | Koishi | G06V 40/173 |
| 2019/0130206 A1* | 5/2019 | Trott | G06N 5/041 |
| 2020/0175305 A1* | 6/2020 | Trott | G06V 10/40 |

\* cited by examiner

AUTONOMOUS EVOLUTION INTELLIGENT DIALOGUE METHOD, SYSTEM, AND DEVICE BASED ON A GAME WITH A PHYSICAL ENVIRONMENT

CROSS REFERENCE TO THE RELATED APPLICATIONS

This application is the national phase entry of International Application No. PCT/CN2019/083354, filed on Apr. 19, 2019, which is based upon and claims priority to Chinese Patent Application No. 201910014369.0, filed on Jan. 8, 2019, the entire contents of which are incorporated herein by reference.

TECHNICAL FIELD

The present disclosure pertains to the field of artificial intelligence and visual dialogue, and specifically relates to an autonomous evolution intelligent dialogue method, system, and device based on a game with a physical environment.

BACKGROUND

In the field of artificial intelligence, supervised training is commonly used for training a model that can understand data. In supervised training, the objective function is designed from the perspective of statistical distribution by maximizing the probability of occurrence of sample data and the corresponding labels, and the model parameters updated accordingly. Supervised training requires a large amount of data. The primary objective of interpreting data from the statistical perspective is different from the actual learning of humans. When important parts of the target task lack labels and references, data interpretation deficiencies often result. There is thus, in turn, a dramatic decline in effective supervised learning.

In addition to imitating, it is essential in actual human learning to perform autonomous updating through the interaction with the outside world under the condition of limited supervision information. Currently, reinforcement learning is a method that can at least in part simulate this process. The goal of reinforcement learning is to maximize the expectation of the reward obtained at each step in a decision by trying to continuously generate actions. Reinforcement learning requires that a complete action space and external rewards be defined. Thus, reinforcement learning is only used for solving a single problem such as how to achieve a higher score in an interactive game, for example. The autonomous evolution of human intelligence requires extensive interactions and games with the physical world, i.e., real world, environment. Current learning methods, however, only simulate interactions and games between intelligent agents, which are preset by humans. While these methods may be effective for specific tasks, different action spaces and reward mechanisms must be introduced between different tasks. As a result, these methods have a poor universality, a complex design, and have difficulties in extending and migrating.

Visual dialogue generation is a critical issue in the field of natural language processing. There are shortcomings, however, with current methods used for artificially generating visual dialog. Current methods include presenting a real-world image, several rounds of a dialogue text history concerning the image, and a sentence input externally in the current round. Next, heretofore dialogue systems typically generate an answer to the external input sentence in the current round. The existing methods based on reinforcement learning and generative adversarial learning can improve the quality of visual dialogue to a certain extent. Computation consumption, however, is excessive, and the convergence rate of the strategy gradient algorithm based on the feedback signal is slow. In addition, the game or interaction with the physical world is not taken into account, or the game with the physical world is accomplished only based on a goal-driven single sample. Thus, the quality of visual dialogue needs to be further improved.

Therefore, in the field of artificial intelligence and visual dialogue, it is crucial to introduce a universal method capable of performing games with the physical environment during the training of the model so as to realize a trilateral game, that is, a game among humans, machines, and the physical world, thereby improving the system capability of integrating visual information, text information, and other multi-modal information without producing an excessively high computational complexity.

SUMMARY

In order to solve the above-mentioned problems in the prior art, that is, to solve the problems of the intelligent system such as high computational consumption, slow convergence rate, and low-accuracy information processing, the present disclosure provides an autonomous evolution intelligent dialogue method based on a game with a physical environment, including:

Step S10, obtaining an image to be processed and a question text corresponding to the image.

Step S20: generating the image to be processed and an answer text of the question text corresponding to the image by using an optimized dialogue model.

Step S30: outputting the answer text.

The dialogue model includes an image encoding model, a text encoding model, a state encoding model, and a decoder.

The image encoding model is constructed based on a pre-trained convolutional neural network.

The text encoding model, the state encoding model, and the decoder are language models based on a recurrent neural network.

The text encoding model includes a question encoder and a fact encoder.

In some preferred embodiments, a discriminator needs to be introduced in an optimization process of the optimized dialogue model. The dialogue model and the discriminator are alternately optimized until a value of a hybrid loss function of the dialogue model and a value of a loss function of the discriminator do not decrease or fall below a preset value, and the steps thereof are as follows:

Step M10: obtaining an image set representing a physical environment and a dialogue text corresponding to the image set, using the image set and the dialogue text as a first image set and a first dialogue text set; wherein the first dialogue text set includes a first question text set and a first answer text set.

Step M20: using the image encoding model to encode each image in the first image set to generate a first image vector and obtain a first image vector set.

Step M30, fusing the first image vector set, using the question encoder, the fact encoder, and the state encoding model to encode all rounds of the dialogues of the dialogue texts in the first dialogue text set into state vectors corresponding to the round sequence to obtain a first state vector set.

Step M40, using the first state vector set to generate answers corresponding to round sequence by the decoder to obtain a second answer text set; using the first state vector set to generate a second image vector set by a single-layer perception mapping function.

Step M50, calculating a probability that all image vectors in the second image vector set belong to a physical environment vector by the discriminator; using the probability and the first answer text set to optimize the dialogue model to obtain a first optimized dialogue model.

Step M60, sampling the first image vector set and the second image vector set to generate an adversarial training sample pool; optimizing the discriminator to obtain a first optimized discriminator.

In some preferred embodiments, the step of constructing the image encoding model further includes a pre-training step, and the pre-training step includes the following steps:

Step T10, selecting an image set containing the physical environment, and using the image set as a pre-training image set.

Step T20, performing pre-training on a convolutional neural network model, wherein an object category of each image in the pre-training image is used as a label, and the pre-trained convolutional neural network is the image encoding model.

In some preferred embodiments, the first image vector is obtained by the following formula:

$$I = CNN_{pre}(Img)$$

where, I represents the first image vector, $CNN_{pre}$ represents the image encoding model, and Img represents each image in the image set.

In some preferred embodiments, in step M20, the method of "using the image encoding model to encode each image in the first image set to generate the first image vector" includes:

inputting each image in the first image set into the image encoding model, and outputting a fully connected layer vector corresponding to the last layer of the image, wherein the vector encodes information of each layer of the input image to obtain the first image vector set.

In some preferred embodiments, in step M30, the step of "fusing the first image vector set, using the question encoder, the fact encoder, and the state encoding model to encode all rounds of the dialogues of the dialogue texts in the first dialogue text set into the state vectors corresponding to the round sequence" includes:

Step M31, encoding each word in all rounds of the dialogue texts into a word vector by a word mapping method to obtain a word vector set.

Step M32, in the $t^{th}$ round of dialogue text, based on the word vector set, using the question encoder to encode the question text into a question vector; using the fact encoder to jointly encode the question text and the answer text into the fact vector; using the state encoder to fuse and encode the question vector of the question text, the fact vector, the first image vector corresponding to the fact vector, and the state vector in the $(t-1)^{th}$ round; wherein $1 \leq t \leq T$, T represents a total number of rounds of the dialogue.

Step M33, using the state vectors in various rounds obtained in step M32 to construct a second state vector set.

In some preferred embodiments, the text encoding model includes the question encoder, and the fact encoder; the word vector, the question vector, the fact vector, and the state vector is calculated as follows:

$$e = Aw, e \in \mathbb{R}^b, w \in \mathbb{R}^v, A \in \mathbb{R}^{b \times v}$$

where, e represents the word vector, b represents a dimension of the word vector, v represents a size of vocabulary formed by all the words in the data set, and w represents a one-hot code of each word.

$$q_t = Enc^q(\{e_1, \ldots e_n\}_t), q_t \in \mathbb{R}^d$$

where, $q_t$ represents the question vector of the question text, $Enc^q$ represents the question encoder, and $\{e_1, \ldots e_n\}_t$ represents a word vector sequence of questions.

$$h_t^f = Enc^f(\{e_1, \ldots e_{m+n}\}_t), h_t^f \in \mathbb{R}^d$$

where, $h_t^f$ represents the fact vector, $Enc^f$ represents the fact encoder; $\{e_1, \ldots e_{m+n}\}_t$ represents a concatenation sequence of a word vector sequence of the questions and answers in the $t^{th}$ round.

$$s_t = LSTM^s(concat(q_t, h_{t-1}^f, I), s_{t-1}), s_t \in \mathbb{R}^d$$

where, $s_t$ represents a state vector in the current round; $LSTM^s$ represents the state encoder, and only one-step operation is performed within each dialogue in the $t^{th}$ round; $s_{t-1}$ represents a state of a hidden layer in the $(t-1)^{th}$ round; $q_t$ represents the question vector of the question text in the current round; $h_{t-1}^f$ represents a fact vector in the previous round; I represents the first image vector on which the dialogue is based.

In some preferred embodiments, in step M40, the method of "using the first state vector set to generate the answers corresponding to the round sequence by the decoder to obtain the second answer text set; using the first state vector set to generate the second image vector set by the single-layer perception mapping function" includes:

using the decoder to generate each word of a predicted answer in sequence, wherein the state vector in each round in the first state vector set as an initial state; using the predicted answer as an answer corresponding to a round sequence to obtain a second answer text set; using the single-layer perception mapping function to map the state vector in each round of the first state vector set into the image vector corresponding to the round sequence to obtain the second image vector set.

The second image vector $s_t'$ is as follows:

$$s_t' = ReLU(W_p s_t), s_t' \in \mathbb{R}^D$$

where, $s_t'$ represents the second image vector; D represents the dimension of the second image vector and the dimension of the first image vector I; $W_p$ represents a connection weight of a single-layer perceptron; ReLU represents an activation function used by the single-layer perceptron.

In some preferred embodiments, in step M50, the step of "calculating the probability that all image vectors in the second image vector set belong to the physical environment vector by the discriminator and using the probability and the first answer text set to optimize the dialogue model" includes:

Step M51: inputting each image vector in the second image vector set into the discriminator to obtain a probability that the image vector belongs to the physical environment vector; comparing the second answer text set with the first answer text set to calculate the loss function of supervised training and the loss function of the game with the physical environment.

Step M52, combining the loss function with a probability that the second image vector set belongs to a real physical environment vector to calculate the hybrid loss function.

Step M53, calculating a gradient of the hybrid function to parameters of the encoder, the decoder, and the mapping function; updating the parameters of the encoder, the decoder, and the single-layer perception mapping function to obtain the first optimized dialogue model.

In some preferred embodiments, the calculation method of the probability that the second image vector belongs to the physical environment vector is as follows:

$$\hat{p}_v(\text{real}|s_t') = \text{DBot}(s_t')$$

where, $\hat{p}_v$ represents the probability that the second image vector belongs to the physical environment vector, DBot( ) represents the discriminator, and $s_t'$ represents the second image vector.

In some preferred embodiments, the calculation method of the loss function of the supervised training, the loss function of the game with the physical environment, and the hybrid loss function is as follows:

$$L_{su} = 1/T\Sigma_{t=1}^{T} 1/N\Sigma_{n=1}^{N} -\log(p(w_n^t|w_{<n}^t))$$

$$L_{adv} = -E_{s_t'\sim dialog}[\text{DBot}(s_t')]$$

$$L_G = L_{su} + \lambda L_{adv}$$

where, $L_{su}$ represents the loss function of the supervised training, $L_{adv}$ represents the loss function of the game with the physical environment, $L_G$ represents the hybrid loss function, N represents a length of the actual dialogue answer in the $t^{th}$ round, $\{w_1^t, \ldots, w_N^t\}$ represents the word sequence of the first answer text, T represents the total number of the rounds of the dialogues, $p(w_n^t|w_{<n}^t)$ represents the generation probability of each word in the sequence, $E_{s_t'\sim dialog}( )$ represents the average value of the probability that the second image vector belongs to the physical environment vector, and $\lambda$ represents a hyperparameter.

In some preferred embodiments, in step M60, the step of "sampling the first image vector set and the second image vector set to generate the adversarial training sample pool and optimizing the discriminator" includes:

Step M61, selecting a plurality of samples from the first image vector set and marking the plurality of samples as true; selecting a plurality of samples from the second image vector set and marking the plurality of samples as false; wherein, all labeled vectors form a training sample pool of the discriminator.

Step M62, calculating the loss function of the discriminator to make the probability of the true samples output by the discriminator higher and make the probability of the false samples output by the discriminator lower; and updating the parameters of the discriminator to obtain an optimized discriminator.

In some preferred embodiments, the calculation method of the loss function of the discriminator is as follows:

$$L_D = -E_{I\sim p(I)}[\text{DBot}(I)] + E_{s_t'\sim dialog}[\text{DBot}(s_t')]$$

where, $L_D$ represents the loss function of the discriminator, I represents the first image vector, $s_t'$ represents the second image vector, DBot( ) represents the discriminator, $E_{s_t'\sim dialog}$ represents the average value of the probability that the second image vector belongs to the physical environment vector, and $E_{I\sim p(I)}$ represents the average value of the probability of outputting the true sample.

Another aspect of the present disclosure provides an autonomous evolution intelligent dialogue system based on a game with a physical environment, including: an acquisition module, a dialogue model, and an output module.

The acquisition module is configured to acquire and input an image to be processed and question information corresponding to the image.

The dialogue model is configured to use an optimized dialogue model to generate the image to be processed and the answer information of the question information corresponding to the image.

The output module is configured to output the answer information.

The dialogue model includes an image encoding module, a text encoding module, and a decoding module.

The image encoding module is configured to use an established image encoding model to encode each image in the obtained first image set to generate a first image vector and obtain a first image vector set.

The text encoding module is configured to fuse the first image vector set, and use the text encoding model and the state encoding model to encode the dialogue texts of all rounds of the dialogue text in the first dialogue text set into state vectors corresponding to the round sequence to obtain a first state vector set.

The decoding module is configured to generate the answer text corresponding to the round sequence based on the first state vector set.

The third aspect of the present disclosure provides a storage device. A plurality of programs are stored in the storage device, and the plurality of programs are configured to be loaded and executed by a processor to realize the above-mentioned autonomous evolution intelligent dialogue method based on the game with the physical environment.

The fourth aspect of the present disclosure provides a processing unit, including a processor and a storage device. The processor is configured to execute various programs. The storage device is configured to store a plurality of programs. The plurality of programs are configured to be loaded and executed by the processor to realize the above-mentioned autonomous evolution intelligent dialogue method based on the game with the physical environment.

The present disclosure has the following advantages:

(1) In the autonomous evolution intelligent dialogue method based on the game with the physical environment of the present disclosure, the adversarial training and supervised training is collectively used to form a closely related distribution between the state vector generated by the encoding model and the decoding model and the image vector of the physical world, which realizes a trilateral game between the intelligent agent and humans, and between the intelligent agent and the physical environment, improves the accuracy and fluency of the dialogue answer, and also avoids a large computational burden caused by reinforcement learning.

(2) In the present disclosure, extensive information of the real physical world is introduced in the autonomous evolution intelligent dialogue method based on the game with the physical environment. Compared with the existing methods, the method of the present disclosure can make full use of the extensive and easily available information of the physical environment, so that the model can acquire more universal and extensible knowledge through the autonomous evolution in the game with the physical environment.

(3) The autonomous evolution intelligent system of the present disclosure is accomplished by the interactive game with the physical environment, which can better simulate the learning process of humans, and relies on easily available resources to obtain more universal knowledge. In addition, the physical environment resources are unsupervised information, have a sufficient amount of data and are easy to obtain.

BRIEF DESCRIPTION OF THE DRAWINGS

Other features, objectives, and advantages of the present disclosure will be clearly described hereinafter with reference to the detailed description of the non-limited embodiments and the following drawings.

DETAILED DESCRIPTION OF THE EMBODIMENTS

The present disclosure will be expressly described hereinafter with reference to the drawings and embodiments. It can be understood that the specific embodiments described herein are only intended to illustrate the present disclosure rather than limiting the present disclosure. It should also be noted that, in order to facilitate the description, only the parts related to the present disclosure are shown in the drawings.

It should be noted that, the embodiments in the present disclosure and the features in the embodiments can be combined with one another without conflicts. The present disclosure will be expressly described hereinafter with reference to the drawings and embodiments.

The method for processing and generating dialogues through natural language in the prior art is mainly based on the method of reinforcement learning and generated adversarial learning, which can improve the quality of the dialogue to some extent. However, this method still has two deficiencies as follows. (1) a large number of sampling trials and errors must be performed when each word or sentence is generated, so as to accurately estimate the loss function based on the feedback signal and the expectation. The strategy gradient algorithm based on the feedback signal has a slow convergence rate, resulting in excessively large computational consumption. (2) This method without consideration for the game with the physical world is accomplished by the text itself and driven by a simple goal, resulting in low accuracy of information processing. In the present disclosure, a universal method of performing games with the physical environment is introduced to realize a trilateral game of human, machine, and physical world, so as to improve the system capability of integrating multi-modal information without producing an excessively high computational complexity, which has low computational consumption and a high convergence rate, and further improves the accuracy of information processing.

In the present disclosure, the autonomous evolution intelligent dialogue method based on the game with the physical environment includes:

Step S10, the image to be processed and the question text corresponding to the image are obtained.

Step S20: the image to be processed and the answer text of the question text corresponding to the image are generated by using the optimized dialogue model.

Step S30: the answer text is output.

The dialogue model includes the image encoding model, the text encoding model, the state encoding model, and the decoder.

The image encoding model is constructed based on the pre-trained convolutional neural network.

The text encoding model, the state encoding model, and the decoder are language models based on a recurrent neural network.

The text encoding model includes the question encoder and the fact encoder.

Figure 1:
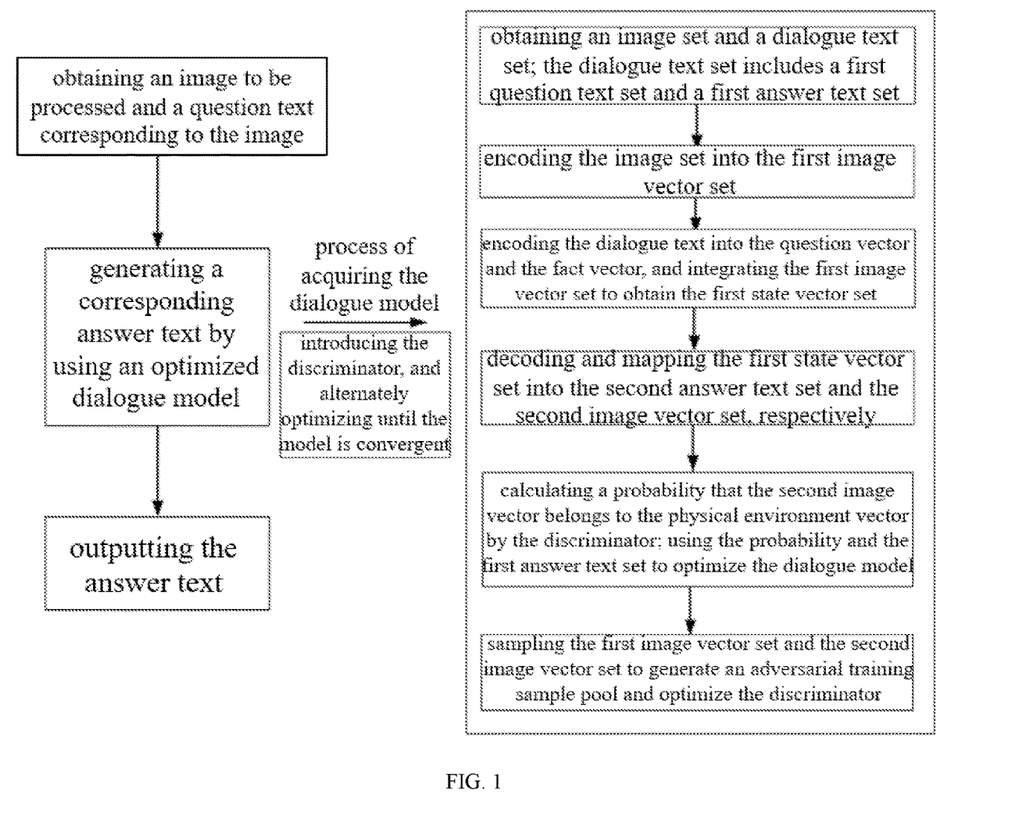
FIG. 1 is a schematic flow chart showing the autonomous evolution intelligent dialogue method based on the game with the physical environment according to the present disclosure.

In order to clearly describe the autonomous evolution intelligent dialogue method based on the game with the physical environment of the present disclosure, each step in the method embodiment of the present disclosure will be described in detail hereinafter with reference to FIG. 1.

The autonomous evolution intelligent dialogue method based on the game with the physical environment includes steps S10-S30, and these steps are described in detail as follows:

Step S10, the image to be processed and the question text corresponding to the image are obtained.

Step S20: the image to be processed and the answer text of the question text corresponding to the image are generated by using the optimized dialogue model.

The dialogue model includes the image encoding model, the text encoding model, the state encoding model, and the decoder.

The text encoding model, the state encoding model, and the decoder are language models based on a recurrent neural network.

The text encoding model includes the question encoder and the fact encoder.

The image encoding model is constructed based on the pre-trained convolutional neural network, including the following steps:

Step T10, the image set containing the physical environment is selected and is used as the pre-training image set.

Step T20, the pre-training is performed on the convolutional neural network model, wherein the object category of each image in the pre-training image is used as a label, and the pre-trained convolutional neural network is the image encoding model.

In the embodiment of the present disclosure, the ImageNet is selected as a large-scale data set containing a large number of real-world images, the mature convolutional neural network model VGG16 is pre-trained, and the object category in each image in the data set is used as a label to perform the pre-training to obtain the image encoding model $CNN_{pre}$.

The discriminator needs to be introduced in the optimization process of the dialogue model. The dialogue model and the discriminator are alternately optimized until the value of the hybrid loss function of the dialogue model and the value of the loss function of the discriminator do not decrease or fall below a preset value, and the steps thereof are as follows:

Step M10: the image set representing the physical environment and the dialogue text corresponding to the image set are obtained and used as the first image set and the first dialogue text set; wherein the first dialogue text set includes the first question text set and the first answer text set.

Step M20: the image encoding model is configured to encode the first image set to generate the first image vector and obtain the first image vector set.

The image encoding model $CNN_{pre}$ can output a vector of the fully connected layer of the last layer of the input image.

The vector encodes the information of each layer of the input image and is the first image vector I, as shown in formula (1):

$$I = CNN_{pre}(\text{Img}) \quad (1)$$

where, I represents the first image vector, $CNN_{pre}$ represents the image encoding model, and Img represents each image in the image set.

The image vector is obtained from each image in the first image set according to the above-mentioned method, so as to form the first image vector set. The parameters of the $CNN_{pre}$ model are not updated as the model is trained.

Step M30, the first image vector set is fused, the question encoder, the fact encoder, and the state encoding model are configured to encode all rounds of the dialogues of the dialogue texts in the first dialogue text set into the state vectors corresponding to the round sequence to obtain the first state vector set.

Step M31, each word in all rounds of the dialogue texts is encoded into a word vector by the word mapping method to obtain the word vector set.

Figure 2:
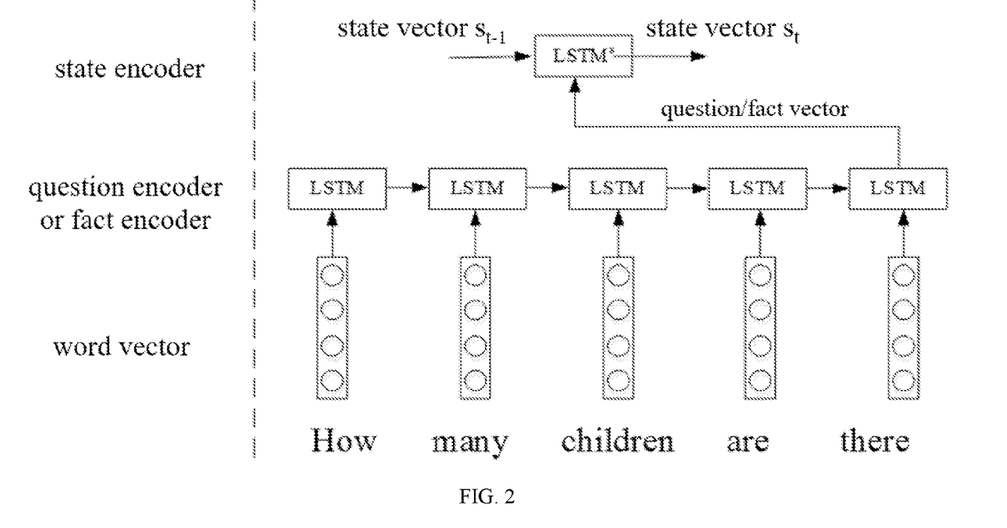
FIG. 2 is a schematic diagram showing the question encoder and the fact encoder in one round of the dialogue of the autonomous evolution intelligent dialogue method based on the game with the physical environment according to an embodiment of the present disclosure.

Step M32, in the $t^{th}$ round of dialogue text, based on the word vector set, the question encoder is configured to encode the question text into the question vector; the fact encoder is configured to jointly encode the question text and the answer text into the fact vector; the state encoder is configured to fuse and encode the question vector of the question text, the fact vector, the first image vector corresponding to the fact vector, and the state vector in the $(t-1)^{th}$ round into the state vector in the $t^{th}$ round; wherein $1 \leq t \leq T$, T represents a total number of rounds of the dialogue. FIG. 2 is a schematic diagram showing the question encoder and the fact encoder according to an embodiment of the present disclosure.

Step M33, the state vectors in various rounds obtained in step M32 are configured to construct the second state vector set.

In the $t^{th}$ round of the dialogue history, $\{x_1, \ldots, x_n\}_t$ is referred to as a question, the standard answer $\{y_1, \ldots y_m\}_t$ of the question provided by the data set is referred to as an answer. Each word $w \in \{x_1, \ldots x_n, y_1, \ldots y_m\}_t$ in the question and the answer is a one-hot code vector and the one-hot code vector can be mapped into the word vector e by the word mapping matrix, as shown in formula (2):

$$e = Aw, e \in \mathbb{R}^b, w \in \mathbb{R}^v, A \in \mathbb{R}^{b \times v} \quad (2)$$

where, b represents a dimension of the word vector, v represents a size of the vocabulary formed by all the words in the data set, and w represents the one-hot code of each word.

In the present embodiment, the long short-term memory (LSTM) network model is used as the question encoder $Enc^q$. The LSTM network is a recurrent neural network, wherein each time a word vector of a word is input, the network calculates the hidden layer state at a new moment based on the input word vector and the hidden layer state at the previous moment. The sequence $\{e_1, \ldots e_n\}_t$ of word vectors of the question is input to the question encoder, and the hidden layer state at the last moment is used as the question vector $q_t$, as shown in formula (3):

$$q_t = Enc^q(\{e_1, \ldots e_n\}_t), q_t \in \mathbb{R}^d \quad (3)$$

The LSTM model is used as the fact encoder $Enc^f$, the word vector sequences of the question and the answer in the $t^{th}$ round are concatenated, and $\{e_1, \ldots e_{m+n}\}_t$ is obtained and input to the fact encoder. The hidden layer state obtained at the last moment is used as the fact vector $h_t^f$, as shown in formula (4):

$$h_t^f = Enc^f(\{e_1, \ldots e_{m+n}\}_t), h_t^f \in \mathbb{R}^d \quad (4)$$

The question information and the answer information of the dialogue in the current round are recorded in the fact vector and is used as the historical information input in the next round (i.e. the $(t+1)^{th}$ round) of the dialogue.

The LSTM model is used as the state encoder $LSTM^s$, and the layer of the state encoder $LSTM^s$ is above the layer of the question encoder $Enc^q$ and the fact encoder $Enc^f$. Only one-step operation is performed in each round in the t rounds of dialogues. The fact vector $h_{t-1}^f$ and the hidden layer state $s_{t-1}$ in the $(t-1)^{th}$ round, the question vector $h_{t-1}^f$ at the current moment, and the first image vector I on which the whole dialogue is based are input, the state vector $s_t$ in the current round is output, as shown in formula (5):

$$s_t = LSTM^s(\text{concat}(q_t, h_{t-1}^f, I), s_{t-1}), s_t \in \mathbb{R}^d \quad (5)$$

Step M40, the first state vector set is configured to generate answers corresponding to the round sequence by the decoder to obtain the second answer text set. The first state vector set is configured to generate the second image vector set by the single-layer perception mapping function.

The decoder is used to generate each word of the predicted answer in sequence to obtain the answer corresponding to the round sequence, the state vector in each round in the first state vector set is used as an initial state, and the second answer text set is obtained. The single-layer perception mapping function is configured to map the state vector in each round of the first state vector set into the image vector corresponding to the round sequence to obtain the second image vector set.

In the $t^{th}$ round of the dialogue, the single-layer perceptron model is used as the mapping function $f$ to map the state vector $s_t$ to the second image vector $s_t'$, as shown in formula (6):

$$s_t' = ReLU(W_p s_t), s_t' \in R^D \quad (6)$$

where, D represents the dimension of the second image vector and the dimension of the first image vector I; $W_p$ represents the connection weight of the single-layer perceptron; ReLU represents the activation function used by the single-layer perceptron.

Step M50, the probability that all image vectors in the second image vector set belong to a physical environment vector is calculated by the discriminator, and the probability and the first answer text set are configured to optimize the dialogue model to obtain the first optimized dialogue model.

Figure 3:
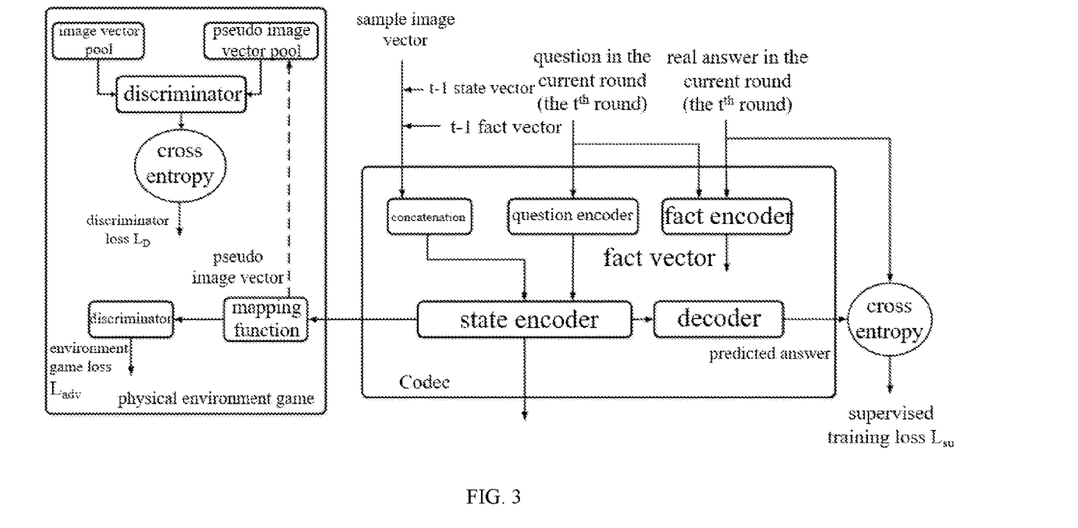
FIG. 3 is a schematic diagram showing the generation process of the loss function of the supervised training and adversarial training of the autonomous evolution intelligent dialogue method based on the game with the physical environment according to an embodiment of the present disclosure.

Step M51: each image vector in the second image vector set is input into the discriminator to obtain the probability that the image vector belongs to the physical environment vector, and the second answer text set is compared with the first answer text set to calculate the loss function of the supervised training and the loss function of the game with the physical environment. FIG. 3 is a schematic diagram showing the generation process of the loss function of the supervised training and adversarial training according to an embodiment of the present disclosure.

In the $t^{th}$ round of the dialogue, the LSTM model is used as the decoder to generate each word of the predicted answer in sequence, wherein the state vector $s_t$ is used as the initial state. The LSTM model structure used by the decoder is the same as the structure of the encoder $Enc^q$ shown in FIG. 2. At each time slice, the decoded words are encoded into a new hidden layer vector. Based on the new hidden layer vector, the probability of generating each word in the vocabulary in the time slice is calculated by the single-layer perceptron model with a softmax activation function.

In the present embodiment, the single-layer perceptron with the rectified linear unit (ReLU) activation function is used as the discriminator DBot( ). The discriminator outputs the probability $\hat{p}_v$ that each second image vector belongs to the physical environment vector, as shown in formula (7):

$$\hat{p}_v(\text{real}|s_t')=\text{DBot}(s_t') \quad (7)$$

where, DBot( ) represents the discriminator and $s_t'$ represents the second image vector.

In the $t^{th}$ round of the dialogue, the answer in the first dialogue text is a word sequence $\{w_1^t, \ldots w_N^t\}$, wherein N represents the sentence length, and T represents the number of rounds of the dialogue history. After all T rounds of the dialogue are completed, the supervised training loss function $L_{su}$ of all the entire answers in the dialogue is calculated through the cross entropy, as shown in formula (8):

$$L_{su} = \frac{1}{T}\sum_{t=1}^{T} \frac{1}{N}\sum_{n=1}^{N} -\log(p(w_n^t | w_{<n}^t)) \quad (8)$$

where, $p(w_n^t|w_{<n}^t)$ represents the generation probability of each word in the sequence.

When the prediction of all T rounds of the dialogue in one sample is ended, for the second image vector $s_t'$ generated in each round, the average value of the probability $\hat{p}_v$ generated by the discriminator is reversed to be minus to obtain the loss function $L_{adv}$ of the game with the physical environment, as shown in formula (9):

$$L_{adv}=-E_{s_t'\sim dialog}[\text{DBot}(s_t')] \quad (9)$$

where, $E_{s_t'\sim dialog}(\ )$ represents the average value of the probability that the second image vector belongs to the physical environment vector.

The generated second image vector is closer to the distribution of the first image vector as the value of $L_{adv}$ is smaller.

Step M52, the loss function is combined with the probability that the second image vector set belongs to the real physical environment vector, so as to calculate the hybrid loss function.

The hybrid loss function $L_G$ is obtained by the weighted summation of the loss function of supervised training and the loss function of the game with the physical environment through the parameter $\lambda$, as shown in formula (10):

$$L_G=L_{su}+\lambda L_{adv} \quad (10)$$

where, $\lambda$ is a hyperparameter.

Step M53, the gradient of the hybrid function relative to the parameters of the encoder, the decoder, and the mapping function is calculated. The parameters of the encoder, the decoder, and the single-layer perception mapping function are updated to obtain the first optimized dialogue model.

In the present embodiment, based on the calculated gradient of the parameters, the adaptive moment estimation algorithm (the Adam algorithm) is configured to update the parameters of the encoder, the decoder, and the mapping function to reduce the value of the loss function.

Step M60, the first image vector set and the second image vector set are sampled to generate the adversarial training sample pool. The discriminator is optimized to obtain the first optimized discriminator.

Step M61, a plurality of samples are selected from the first image vector set and are marked as true, and a plurality of samples are selected from the second image vector set and are marked as false. All labeled vectors are configured to form the training sample pool of the discriminator.

In the present embodiment, a sample subset (with a size of a packet, generally 32) is sampled from the dialogue data. The dialogue text of the sample subset is encoded by the current encoder parameters to generate second image vectors, and the second image vectors are labeled and marked as false.

The same number of the first image vectors (which may not correspond to the sample subset of the dialogue data) are sampled from the first image vector set, and the first image vectors are labeled and marked as true.

All image vectors labeled as true and labeled as false form the training sample pool of the discriminator.

Step M62, the loss function of the discriminator is calculated to make the probability output to the true samples by the discriminator as high as possible and make the probability output to the false samples by the discriminator as low as possible. The parameters of the discriminator are updated to obtain the optimized discriminator.

The loss function $L_D$ of the discriminator is shown in formula (11):

$$L_D=-E_{I\sim p(I)}[\text{DBot}(I)]+E_{s_t'\sim dialog}[\text{DBot}(s_t')] \quad (11)$$

where, I represents the first image vector, $s_t'$ represents the second image vector, DBot( ) represents the discriminator, $E_{s_t'\sim dialog}$ represents the average value of the probability that the second image vector belongs to the physical environment vector, and $E_{I\sim p(I)}$ represents the average value of the probability of outputting the true sample.

The gradient of the loss function $L_D$ of the discriminator relative to the parameters of the discriminator DBot( ) is calculated. Based on the gradient, the root mean square prop (RMSProp) algorithm is employed to update the parameters of the discriminator to reduce the value of the loss function.

Step S30, the answer text is output.

In order to further illustrate the performance of the autonomous evolution intelligent dialogue method based on the game with the physical environment of the present disclosure, in the embodiment of the present disclosure, the VisDial v0.5 multi-round question and answer data set is selected for evaluation. The typical form of data in the VisDial dataset is as follows: An image and the corresponding 10 rounds of natural language dialogue are provided, and the dialogue system reads the image and all previous dialogue history in each round, predicts an answer to the question in this round, and compares the answer with the actual answer. There are 100 candidate sentences for each answer, and the system must give the probability of producing each candidate sentence. The test indicator of the data set is related to the ranking of the probability of the real answer among all candidate answers, and is categorized into five categories, i.e. the mean reciprocal rank (MRR), the recall rate (Recall@1/5/10) of correct answers in the top 1 or 5 or 10 of the generation probability, and the mean rank of the correct answers. The lower mean rank indicates a higher accuracy of the results, and the higher value of the other four indicators indicates a higher accuracy of the results.

The parameter setting is as follows: n=20, b=300, d=512, D=4096, lr=5e−5, $lr^{pre}$=1e−3, bs=32, $\lambda$=10, c=0.01. n represents the maximum sentence length in all training data, b represents the dimension mapped by the word vector, d represents the dimension of the vector generated by all LSTM recurrent neural networks in the encoder and the decoder, and D represents the dimension of the image vector and the second image vector. lr represents the learning rate adopted in supervised training and adversarial training, and $lr^{pre}$ represents the learning rate adopted when pre-training is performed only by supervised learning. During the pre-training, the learning rate gradually declines from 1e−3 to 5e−5, and the pre-training process is performed for 30 rounds in total. bs represents the size of the data packet sampled in each training. λ represents the weight of the loss function of the adversarial training when the hybrid loss function is calculated. c represents the size of the compression interval for the weight of the discriminator during the adversarial training.

Under the above given conditions, after the pre-training is performed in the embodiment of the present disclosure, the adversarial training of performing games with the physical environment is introduced, which can be convergent within 20 rounds. The obtained parameters of the encoder and the decoder are used in the final visual dialogue system.

In the embodiments of the present disclosure, there are several comparative methods as follows:

Comparative method 1: supervised learning pre-training (SL-pretrain) model. The SL-pretrain model is the purely supervised training version of the encoder and the decoder described in the present disclosure. The SL-pretrain model includes a hierarchical text sentence and a dialogue state encoder, and only the supervised loss function is used for training without involving adversarial learning in the game with the physical environment.

Comparative method 2: Answer-Prior model. The Answer-Prior model is a baseline model. The LSTM neural network is configured to directly encode each candidate answer, and then outputs a score by the single-layer perceptron. In the Answer-Prior model, the training is directly performed on all the answers in the training set without considering the image information.

Comparative method 3: memory network (MN) model. The MN model performs discrete vector storage on each round of the dialogue history. When the answer is generated, the historical vector is retrieved in the form of dot product similarity calculation and weighted sum. At the same time, the image vector information is fused, and is decoded by using the recurrent neural network.

Comparative method 4: late fusion (LF) encoder. This method treats all rounds of questions and answers in the dialogue history as a long sequence, and all rounds of questions and answers in the dialogue history are encoded by using an LSTM recurrent neural network. The questions in the current round are encoded by another LSTM recurrent neural network. After the historical code, the question code and the image vectors are concatenated, the fusion mapping is performed by the multilayer perceptron, and the recurrent neural network is configured to perform decoding based on the vectors obtained by the multilayer perceptron.

Comparative method 5: hierarchical recurrent encoder with attention (HREA) model. The structure of the HREA model is similar to the SL-pretrain model described in comparative method 1. Referring to step M32, the only difference between the HREA model and the SL-pretrain model is that, in the HREA model, the fact vector input into the state encoder is not derived from the $(t-1)^{th}$ round, but the parametric attention mechanism is configured to calculate the similarity weights between the current question vector and the fact vector of each round of the dialogue history, and the weighted sum of the fact vectors in each round is calculated and used as a new fact vector to be input into the state encoder.

Comparative method 6: goal-driven reinforcement learning (RL)-Multi model. The model employed in this method is similar to the SL-pretrain model described in comparative method 1. The difference between the goal-driven RL-Multi model and the SL-pretrain model is as follows. After the question is encoded in this method, a prediction of the image vector is generated by the single-layer perceptron based on the question vector. The Euclidean distance between the predicted image vector and the image vector on which the dialogue is based is used as a reward signal. The loss function is calculated by the reinforcement learning method, and a weighted summation is performed on the loss function calculated by the reinforcement learning method and the loss function of supervised training.

The experimental results of the embodiments and comparative methods of the present disclosure are shown in Table 1:

TABLE 1

| Method | MRR | R @ 1 (%) | R @ 5 (%) | R @ 10 (%) | Mean |
| --- | --- | --- | --- | --- | --- |
| SL-pretrain | 0.436 | 33.02 | 53.41 | 60.09 | 21.83 |
| Answer-Prior | 0.311 | 19.85 | 39.14 | 44.28 | 31.56 |
| MN | 0.443 | 34.62 | 53.74 | 60.18 | 21.69 |
| LF | 0.430 | 33.27 | 51.96 | 58.09 | 23.04 |
| HREA | 0.442 | 34.47 | 53.43 | 59.73 | 21.83 |
| RL-Multi | 0.437 | 33.22 | 53.67 | 60.48 | 21.13 |
| Method of the present disclosure | 0.446 | 34.55 | 54.29 | 61.15 | 20.72 |

The experimental results in Table 1 indicate that the embodiment of the autonomous evolution intelligent dialogue method based on the game with the physical environment of the present disclosure significantly improves the performance of the model on various indicators of the data set. The model (SL-pretrain model) with a simple structure and without containing any attention mechanism of texts and images obviously prevails over a majority of other models in all indicators after undergoing the training process described in the present disclosure.

In addition, the adversarial training based on the game with the physical environment in the present disclosure is an ideal approach to improving the performance of the visual dialogue system, and this improvement is stable, robust, and is independent of the structure of the encoder and the decoder. In order to prove it, based on the LF model of the comparative method, the game with the physical environment described in the present disclosure is introduced to perform the training of the hybrid loss function. The performance improvement of different training methods on different models is shown in Table 2:

TABLE 2

| Method | MRR | R @ 1 (%) | R @ 5 (%) | R @ 10 (%) | Mean |
| --- | --- | --- | --- | --- | --- |
| SL-pretrain | 0.436 | 33.02 | 53.41 | 60.09 | 21.83 |
| Improvement by introducing the RL-Multi model | 0.001 | 0.20 | 0.26 | 0.39 | 0.70 |
| Improvement by introducing the method of the present disclosure | 0.010 | 1.53 | 0.88 | 1.06 | 1.11 |
| LF | 0.430 | 33.27 | 51.96 | 58.09 | 23.04 |
| Improvement by introducing the method of the present disclosure | 0.009 | 1.54 | 0.90 | 1.14 | 1.11 |

The comparison of the first three rows in Table 2 shows that based on the identical encoder and the decoder structure, the improvement brought by the game with the physical environment in the present disclosure is much more significant than that of the RL-Multi model of the optimal comparative method 6. The reason thereof is that the comparative method 6 employs a goal-driven reinforcement learning method, and the reward of reinforcement learning is merely related to the only one image involved in the current sample. Due to a high level of abstraction of human language, the real-world image that the 10 rounds of the dialogues in the text can correctly describe is not limited to this one in the real data. Therefore, it is not a reliable aided training method to select the European distance from this image as the reward and punishment signal. In contrast, according to the present disclosure, the state code generated by the encoder is distributed closer to the real-world image through the adversarial training of the game with the physical environment, so as to integrate the prior knowledge from the multi-modality at the distribution level of overall data. The comparison of the last three rows in Table 2 shows that the hybrid loss function of adversarial learning and supervised learning involved in the present disclosure can stably improve the performance of different encoder and the decoder models, which is a highly efficient and universal visual dialogue method. Furthermore, any image data set of the physical environment can be directly used to participate in the game of the model, and the game process of the model is also suitable for any target task that needs to acquire knowledge from the visual information. Therefore, the model obtains the data with ease, and solves the problem of the universality that other autonomous evolution methods are short of.

The second embodiment of the autonomous evolution intelligent dialogue system based on the game with the physical environment includes an acquisition module, a dialogue model, and an output module.

The acquisition module is configured to acquire and input an image to be processed and problem information corresponding to the image.

The dialogue model is configured to use the optimized dialogue model to generate the image to be processed and the answer information of the question information corresponding to the image.

The output module is configured to output the answer information.

The dialogue model includes an image encoding module, a text encoding module, and a decoding module.

The image encoding module is configured to use the established image encoding model to encode each image in the obtained first image set to generate the first image vector and obtain the first image vector set.

The text encoding module is configured to fuse the first image vector set, and use the question encoder, the fact encoder, and the state encoding model to encode the dialogue texts of all rounds of the dialogue text in the first dialogue text set into the state vectors corresponding to the round sequence to obtain the first state vector set.

The decoding module is configured to generate the answer text corresponding to the round sequence based on the first state vector set.

Those skilled in the art can clearly understand that, for the convenience and brevity of the description, the specific working process and related descriptions of the above-mentioned system can refer to the corresponding processes in the foregoing embodiments of the method, which are not repeatedly described herein.

It should be noted that the autonomous evolution intelligent dialogue system based on the game with the physical environment provided in the above-mentioned embodiment is illustrated by the division of the functional modules described above. In practical applications, the above-mentioned function can be allocated and accomplished by different functional modules according to requirements, namely, the modules or steps in the embodiments of the present disclosure are decomposed or combined again. For example, the modules in the above-mentioned embodiments may be combined into one module, or further divided into multiple sub-modules to realize all or part of the functions described above. The designations of the modules and steps involved in the embodiments of the present disclosure are only intended to distinguish each module or step rather than improperly limiting the present disclosure.

The storage device according to the third embodiment of the present disclosure, wherein a plurality of programs are stored in the storage device, and the plurality of programs are configured to be loaded and executed by a processor to achieve the autonomous evolution intelligent dialogue method based on the game with the physical environment mentioned above.

The processing unit according to the fourth embodiment of the present disclosure includes a processor and a storage device. The processor is configured to execute each program. The storage device is configured to store a plurality of programs, and the plurality of programs are configured to be loaded and executed by the processor to achieve the autonomous evolution intelligent dialogue method based on the game with the physical environment mentioned above.

Those skilled in the art can clearly understand that, for the convenience and brevity of the description, the specific working process and related descriptions of the storage device and the processing unit described above can refer to the corresponding processes in the foregoing embodiments of the method, which are not repeatedly described herein.

Those skilled in the art are aware that the modules, methods and steps of the embodiments described in the embodiments disclosed herein can be implemented by electronic hardware, computer software, or a combination of the two. The software modules and the programs corresponding to the methods and steps can be stored in a random access memory (RAM), a memory, a read-only memory (ROM), an electrically programmable ROM, an electrically erasable programmable ROM, a register, a hard disk, a removable disk, a compact disc-read only memory (CD-ROM), or any other form of storage mediums disclosed in the prior art. In order to clearly illustrate the substitutability of electronic hardware and software, the composition and the steps of each embodiment are described in terms of functions in the above-mentioned description. Whether these functions are executed by electronic hardware or software depends on the specific application and design constraints of the technical solution. Those skilled in the art may use different methods for each specific application to implement the described functions, but such implementation should not be construed to fall outside the scope of the present disclosure.

The terminologies "first", "second", and the like are intended to distinguish similar objects rather than describing or indicating a specific order or sequence.

The terminology "include" or any other similar wording is intended to contain a non-exclusive inclusion, so that the process, method, article, device or apparatus including a series of elements includes not only those elements, and also includes other elements that are not explicitly listed, or includes elements inherent in the process, method, article, device or apparatus.

Thus, the technical solution of the present disclosure is described with reference to the preferred embodiments shown in the drawings. However, it is easily understood by those skilled in the art that the scope of protection of the present disclosure is obviously not limited to these specific embodiments. Those skilled in the art can make equivalent modifications or replacements to the related technical features without departing from the principle of the present disclosure, and the technical solution obtained by these modifications or replacements would fall within the scope of protection of the present disclosure.

What is claimed is:

1. An autonomous evolution intelligent dialogue method based on a game with a physical environment, comprising:
   step S10, obtaining an image to be processed and a question text corresponding to the image;
   step S20, generating an answer text of the question text corresponding to the image to be processed by using an optimized dialogue model;
   step S30, outputting the answer text of the question text corresponding to the image to be processed; wherein,
   the optimized dialogue model comprises an image encoding model, a text encoding model, a state encoding model, and a decoder;
   the image encoding model is constructed based on pre-training a convolutional neural network;
   the text encoding model, the state encoding model, and the decoder are language models based on a recurrent neural network;
   the text encoding model comprises a question encoder and a fact encoder;
   wherein, a discriminator is introduced in an optimization process of the optimized dialogue model; a dialogue model and the discriminator are alternately optimized until a value of a hybrid loss function of the optimized dialogue model and a value of a loss function of the discriminator do not decrease or fall below a preset value;
   wherein the optimization process comprises:
   step M10, obtaining an image set and a dialogue text, wherein the image set represents a physical environment, and the dialogue text corresponds to the image set using the image set and the dialogue text as a first image set and a first dialogue text set, respectively; wherein the first dialogue text set comprises a first question text set and a first answer text set;
   step M20, using the image encoding model to encode each image in the first image set to generate a first image vector and obtain a first image vector set;
   step M30, fusing the first image vector set using the question encoder, the fact encoder, and the state encoding model to encode all rounds of dialogues of the dialogue texts in the first dialogue text set into state vectors corresponding to a round sequence; and obtaining a first state vector set;
   step M40, using the first state vector set to generate answers corresponding to the round sequence by the decoder; obtaining a second answer text set; and using the first state vector set to generate a second image vector set by a single-layer perception mapping function;
   step M50, calculating a probability that all image vectors in the second image vector set belong to a physical environment vector by the discriminator; and using the probability and the first answer text set to optimize the dialogue model; and obtaining a first optimized dialogue model; and
   step M60, sampling the first image vector set and the second image vector set; generating an adversarial training sample pool to optimize the discriminator; and obtaining a first optimized discriminator.

2. The autonomous evolution intelligent dialogue method based on the game with the physical environment according to claim 1, wherein, constructing the image encoding model further comprises a pre-training step, and the pre-training step comprises:
   step T10, selecting an image set containing the physical environment, and using the image set containing the physical environment as a pre-training image set; and
   step T20, performing pre-training on a convolutional neural network model to obtain a pre-trained convolutional neural network model, wherein an object category of each image in the pre-training image is used as a label, and the pre-trained convolutional neural network model is the image encoding model.

3. The autonomous evolution intelligent dialogue method based on the game with the physical environment according to claim 1, wherein, the first image vector is obtained by the following formula:

$$I = CNN_{pre}(\text{Img})$$

where, I represents the first image vector, $CNN_{pre}$ represents the image encoding model, and Img represents each image in the image set.

4. The autonomous evolution intelligent dialogue method based on the game with the physical environment according to claim 1, wherein, in the step M20, the method of using the image encoding model to encode each image in the first image set to generate the first image vector comprises:
   inputting each image in the first image set into the image encoding model, and outputting a fully connected layer vector corresponding to a last layer of the each image, wherein the fully connected layer vector encodes information of each layer of the each image to obtain the first image vector set.

5. The autonomous evolution intelligent dialogue method based on the game with the physical environment according to claim 1, wherein, in the step M30, the step of fusing the first image vector set, using the question encoder, the fact encoder, and the state encoding model to encode all rounds of the dialogues of the dialogue texts in the first dialogue text set into the state vectors corresponding to the round sequence comprises:
   step M31, encoding each word in all rounds of the dialogue texts into a word vector by a word mapping method to obtain a word vector set;
   step M32, in a $t^{th}$ round of dialogue text, based on the word vector set, using the question encoder to encode the question text into a question vector; using the fact encoder to jointly encode the question text and the answer text into a fact vector; using the state encoder to fuse and encode the question vector, the fact vector, the first image vector corresponding to the fact vector, and the state vectors in a $(t-1)^{th}$ round into the state vectors in the $t^{th}$ round; wherein $1 \leq t \leq T$, T represents a total number of rounds of the dialogue; and
   step M33, using the state vectors obtained in the step M32 to construct a second state vector set.

6. The autonomous evolution intelligent dialogue method based on the game with the physical environment according to claim 5, wherein, a calculation method of the word vector, the question vector, the fact vector, and the state vector comprises:

$$e = Aw, e \in \mathbb{R}^b, w \in \mathbb{R}^v, A \in \mathbb{R}^{b \times v}$$

where, e represents the word vector, b represents a dimension of the word vector, v represents a size of vocabulary formed by all words in a data set, and w represents a one-hot code of each word in the data set;

$$q_t = \text{Enc}^q(\{e_1, \ldots e_n\}_t), q_t \in \mathbb{R}^d$$

where, $q_t$ represents the question vector, $\text{Enc}^q$ represents the question encoder, and $\{e_1, \ldots e_n\}_t$ represents a word vector sequence of questions;

$$h_t^f = \text{Enc}^f(\{e_1, \ldots e_{m+n}\}_t), h_t^f \in \mathbb{R}^d$$

where, $h_t^f$ represents the fact vector, $\text{Enc}^f$ represents the fact encoder; $\{e_1, \ldots e_{m+n}\}_t$ represents a concatenation sequence of a word vector sequence of the questions and answers in the $t^{th}$ round;

$$s_t = \text{LSTM}^s(\text{concat}(q_t, h_{t-1}^f, I), s_{t-1}), s_t \in \mathbb{R}^d$$

where, $s_t$ represents the state vector in the $t^{th}$ round; $\text{LSTM}^s$ represents the state encoder, and only performs one-step operation within each dialogue in the $t^{th}$ round; $s_{t-1}$ represents a state of a hidden layer in the $(t-1)^{th}$ round; $q_t$ represents the question vector of the question text in the $t^{th}$ round; $h_{t-1}^f$ represents a fact vector in $(t-1)^{th}$ round; I represents the first image vector, wherein the dialogue is based on the first image vector.

7. The autonomous evolution intelligent dialogue method based on the game with the physical environment according to claim 1, wherein, in the step M40, the method of using the first state vector set to generate the answers corresponding to the round sequence by the decoder; obtaining the second answer text set; and using the first state vector set to generate the second image vector set by the single-layer perception mapping function comprises:

using the decoder to generate each word of a predicted answer in sequence, wherein the state vector in each round in the first state vector set is used as an initial state; using the predicted answer as an answer corresponding to the round sequence to obtain a second answer text set; using the single-layer perception mapping function to map the state vector in each round of the first state vector set into an image vector corresponding to the round sequence; and obtaining the second image vector set.

8. The autonomous evolution intelligent dialogue method based on the game with the physical environment according to claim 7, wherein, the second image vector is obtained by the following formula:

$$s_t' = \text{ReLU}(W_p s_t), s_t' \in R^D$$

where, $s_t'$ represents the second image vector; D represents a dimension of the second image vector and a dimension of the first image vector I; $W_p$ represents a connection weight of a single-layer perceptron; ReLU represents an activation function used by the single-layer perceptron.

9. The autonomous evolution intelligent dialogue method based on the game with the physical environment according to claim 1, wherein, in the step M50, the step of calculating the probability that all image vectors in the second image vector set belong to the physical environment vector by the discriminator and using the probability and the first answer text set to optimize the dialogue model comprises:

step M51, inputting each image vector in the second image vector set into the discriminator to obtain a probability that the second image vector in the second image vector set belongs to the physical environment vector; comparing the second answer text set with the first answer text set; and calculating a loss function of a supervised training and a loss function of the game with the physical environment;

step M52, combining the loss function of the supervised training and the loss function of the game with the physical environment with the probability that the second image in the second image vector set belongs to the physical environment vector; and calculating the hybrid loss function; and step M53, calculating a gradient of the hybrid loss function to parameters of the encoder, the decoder, and the single-layer perception mapping function; updating the parameters of the encoder, the decoder, and the single-layer perception mapping function; and obtaining the first optimized dialogue model.

10. The autonomous evolution intelligent dialogue method based on the game with the physical environment according to claim 9, wherein, a calculation method of the probability that the second image vector belongs to the physical environment vector is as follows:

$$\hat{p}_v(\text{real}|s_t') = \text{DBot}(s_t')$$

where, $\hat{p}_v$ represents the probability that the second image vector belongs to the physical environment vector, $\text{DBot}(\,)$ represents the discriminator, and $s_t'$ represents the second image vector.

11. The autonomous evolution intelligent dialogue method based on the game with the physical environment according to claim 9, wherein, a calculation method of the loss function of the supervised training, the loss function of the game with the physical environment, and the hybrid loss function is as follows:

$$L_{su} = \frac{1}{T} \sum_{t=1}^{T} \frac{1}{N} \sum_{n=1}^{N} -\log(p(w_n^t | w_{<n}^t))$$

$$L_{adv} = -E_{s_t' \sim dialog}[\text{DBot}(s_t')]$$

$$L_G = L_{su} + \lambda L_{adv}$$

where, $L_{su}$ represents the loss function of the supervised training, $L_{adv}$ represents the loss function of the game with the physical environment, $L_G$ represents the hybrid loss function, N represents a length of an actual dialogue answer in the $t^{th}$ round, $\{w_1^t, \ldots, w_N^t\}$ represents a word sequence of the first answer text set, T represents a total number of the rounds of the dialogue, $p(w_n^t|w_{<n}^t)$ represents a generation probability of each word in the word sequence of the first answer text set, $E_{s_t' \sim dialog}(\,)$ represents an average value of the probability that the second image vector belongs to the physical environment vector, and $\lambda$ represents a hyperparameter.

12. The autonomous evolution intelligent dialogue method based on the game with the physical environment according to claim 1, wherein, in the step M60, the step of sampling the first image vector set and the second image vector set and generating the adversarial training sample pool to optimize the discriminator comprises:

step M61, selecting a plurality of samples from the first image vector set and marking the plurality of samples as true to obtain true samples; selecting a plurality of samples from the second image vector set and marking the plurality of samples as false to obtain false samples;

wherein all labeled vectors form the adversarial training sample pool of the discriminator; and step M62, calculating a loss function of the discriminator to make the discriminator have a high probability of outputting the true samples and have a low probability of outputting the false samples by the discriminator lower; updating parameters of the discriminator to obtain the first optimized discriminator.

13. The autonomous evolution intelligent dialogue method based on the game with the physical environment according to claim 12, wherein, a calculation method of the loss function of the discriminator is as follows:

$$L_D = -E_{I \sim p(I)}[\text{DBot}(I)] + E_{s_t' \sim dialog}[\text{DBot}(s_t')]$$

where, $L_D$ represents the loss function of the discriminator, I represents the first image vector, $s_t'$ represents the second image vector, DBot( ) represents the discriminator, $E_{s_t' \sim dialog}$ represents the average value of the probability that the second image vector belongs to the physical environment vector, and $E_{I \sim p(I)}$ represents an average value of a probability of outputting the true samples.

14. An autonomous evolution intelligent dialogue system based on a game with the physical environment, comprising: an acquisition module, a dialogue model, and an output module; wherein,
the acquisition module is configured to acquire and input an image to be processed and question information corresponding to the image to be processed;
the dialogue model is configured to use an optimized dialogue model to generate answer information of the question information corresponding to the image to be processed;
the output module is configured to output the answer information;
wherein, the dialogue model comprises an image encoding module, a text encoding module, and a decoding module;
the image encoding module is configured to use an established image encoding model to encode each image in an obtained first image set, generate a first image vector, and obtain a first image vector set;
the text encoding module is configured to fuse the first image vector set, and use a text encoding model and a state encoding model to encode each dialogue text of all rounds of the dialogue texts in the first dialogue text set into a state vector corresponding to a round sequence, and obtain a first state vector set; and
the decoding module is configured to generate an answer text corresponding to the round sequence based on the first state vector set;
wherein a discriminator is introduced in an optimization process of the optimized dialogue model; the dialogue model and the discriminator are alternately optimized until a value of a hybrid loss function of the optimized dialogue model and a value of a loss function of the discriminator do not decrease or fall below a preset value;
wherein the optimization process comprises:
step M10, obtaining an image set and a dialogue text, wherein the image set represents a physical environment, and the dialogue text corresponds to the image set; using the image set and the dialogue text as a first image set and a first dialogue text set, respectively; wherein the first dialogue text set comprises a first question text set and a first answer text set;

step M20, using the image encoding model to encode each image in the first image set to generate a first image vector and obtain a first image vector set;
step M30, fusing the first image vector set using the question encoder, the fact encoder, and the state encoding model to encode all rounds of dialogues of the dialogue texts in the first dialogue text set into state vectors corresponding to a round sequence; and obtaining a first state vector set;
step M40, using the first state vector set to generate answers corresponding to the round sequence by the decoder; obtaining a second answer text set; and using the first state vector set to generate a second image vector set by a single-layer perception mapping function;
step M50, calculating a probability that all image vectors in the second image vector set belong to a physical environment vector by the discriminator; and using the probability and the first answer text set to optimize the dialogue model; and obtaining a first optimized dialogue model; and
step M60, sampling the first image vector set and the second image vector set; generating an adversarial training sample pool to optimize the discriminator; and obtaining a first optimized discriminator.

15. A processing unit, comprising:
a processor, configured to execute a plurality of programs; and
a storage device, configured to store the plurality of programs;
wherein, the plurality of programs are configured to be loaded and executed by the processor to realize an autonomous evolution intelligent dialogue method based on a game with a physical environment, the autonomous evolution intelligent dialogue method based on the game with the physical environment, comprising:
step S10, obtaining an image to be processed and a question text corresponding to the image;
step S20, generating an answer text of the question text corresponding to the image to be processed by using an optimized dialogue model;
step S30, outputting the answer text of the question text corresponding to the image to be processed; wherein,
the optimized dialogue model comprises an image encoding model, a text encoding model, a state encoding model, and a decoder;
the image encoding model is constructed based on pre-training a convolutional neural network;
the text encoding model, the state encoding model, and the decoder are language models based on a recurrent neural network;
the text encoding model comprises a question encoder and a fact encoder;
wherein, a discriminator is introduced in an optimization process of the optimized dialogue model; a dialogue model and the discriminator are alternately optimized until a value of a hybrid loss function of the optimized dialogue model and a value of a loss function of the discriminator do not decrease or fall below a preset value;
wherein the optimization process comprises:
step M10, obtaining an image set and a dialogue text, wherein the image set represents a physical environment, and the dialogue text corresponds to the image set; using the image set and the dialogue text as a first image set and a first dialogue text set, respectively;

wherein the first dialogue text set comprises a first question text set and a first answer text set;

step M20, using the image encoding model to encode each image in the first image set to generate a first image vector and obtain a first image vector set;

step M30, fusing the first image vector set; using the question encoder, the fact encoder, and the state encoding model to encode all rounds of dialogues of the dialogue texts in the first dialogue text set into state vectors corresponding to a round sequence; and obtaining a first state vector set;

step M40, using the first state vector set to generate answers corresponding to the round sequence by the decoder; obtaining a second answer text set; and using the first state vector set to generate a second image vector set by a single-layer perception mapping function;

step M50, calculating a probability that all image vectors in the second image vector set belong to a physical environment vector by the discriminator; and using the probability and the first answer text set to optimize the dialogue model; and obtaining a first optimized dialogue model; and step M60, sampling the first image vector set and the second image vector set; generating an adversarial training sample pool to optimize the discriminator; and obtaining a first optimized discriminator.

16. The autonomous evolution intelligent dialogue method based on the game with the physical environment according to claim 3, wherein, in the step M20, the method of using the image encoding model to encode each image in the first image set to generate the first image vector comprises:

inputting each image in the first image set into the image encoding model, and outputting a fully connected layer vector corresponding to a last layer of the each image, wherein the fully connected layer vector encodes information of each layer of the each image to obtain the first image vector set.

17. The processing unit according to claim 15, wherein, constructing the image encoding model further comprises a pre-training step, and the pre-training step comprises:

step T10, selecting an image set containing the physical environment, and using the image set containing the physical environment as a pre-training image set; and step T20, performing pre-training on a convolutional neural network model to obtain a pre-trained convolutional neural network model, wherein an object category of each image in the pre-training image is used as a label, and the pre-trained convolutional neural network model is the image encoding model.

* * * * *